No. 745,810. PATENTED DEC. 1, 1903.
J. H. FELMLEE.
WRAPPING MACHINE.
APPLICATION FILED NOV. 12, 1898.
NO MODEL. 6 SHEETS—SHEET 4.

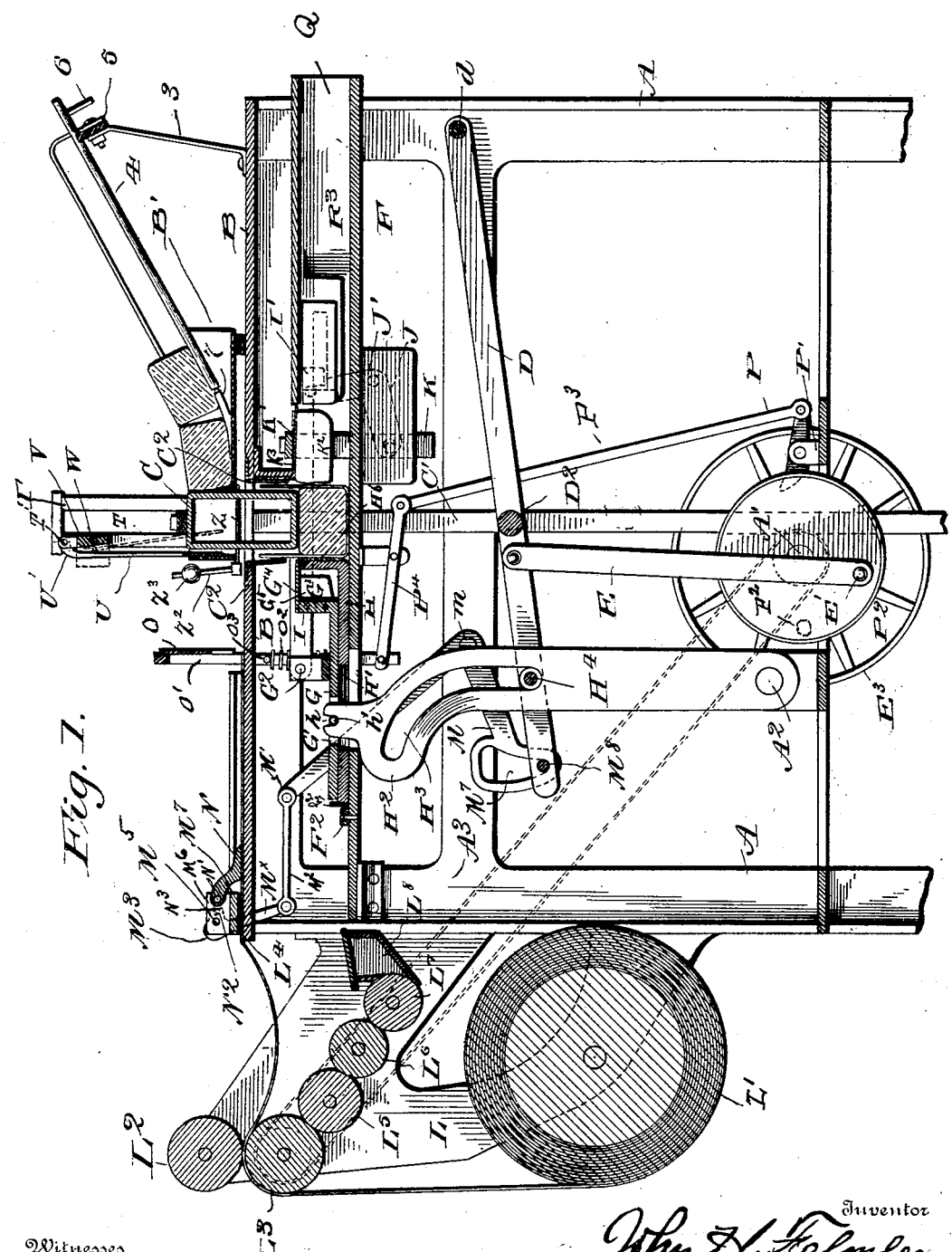

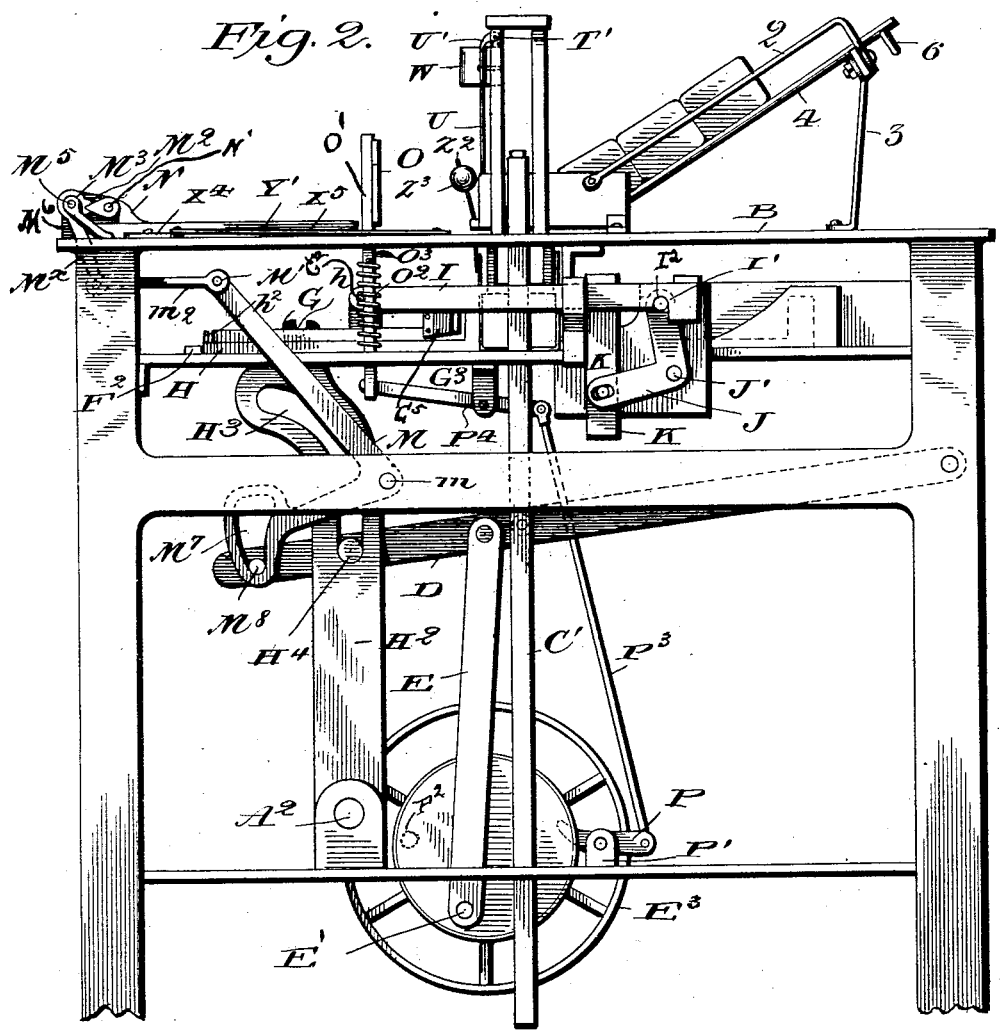
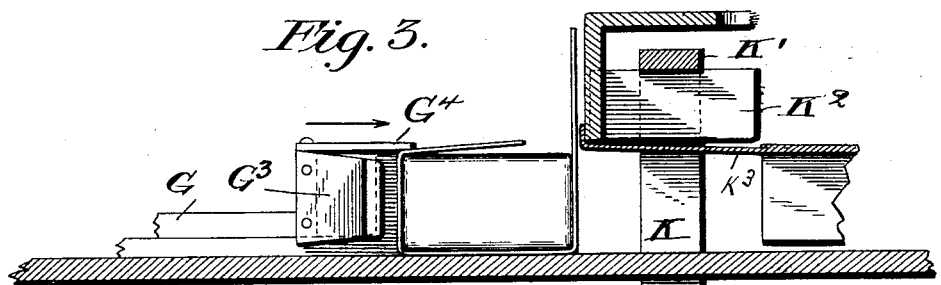

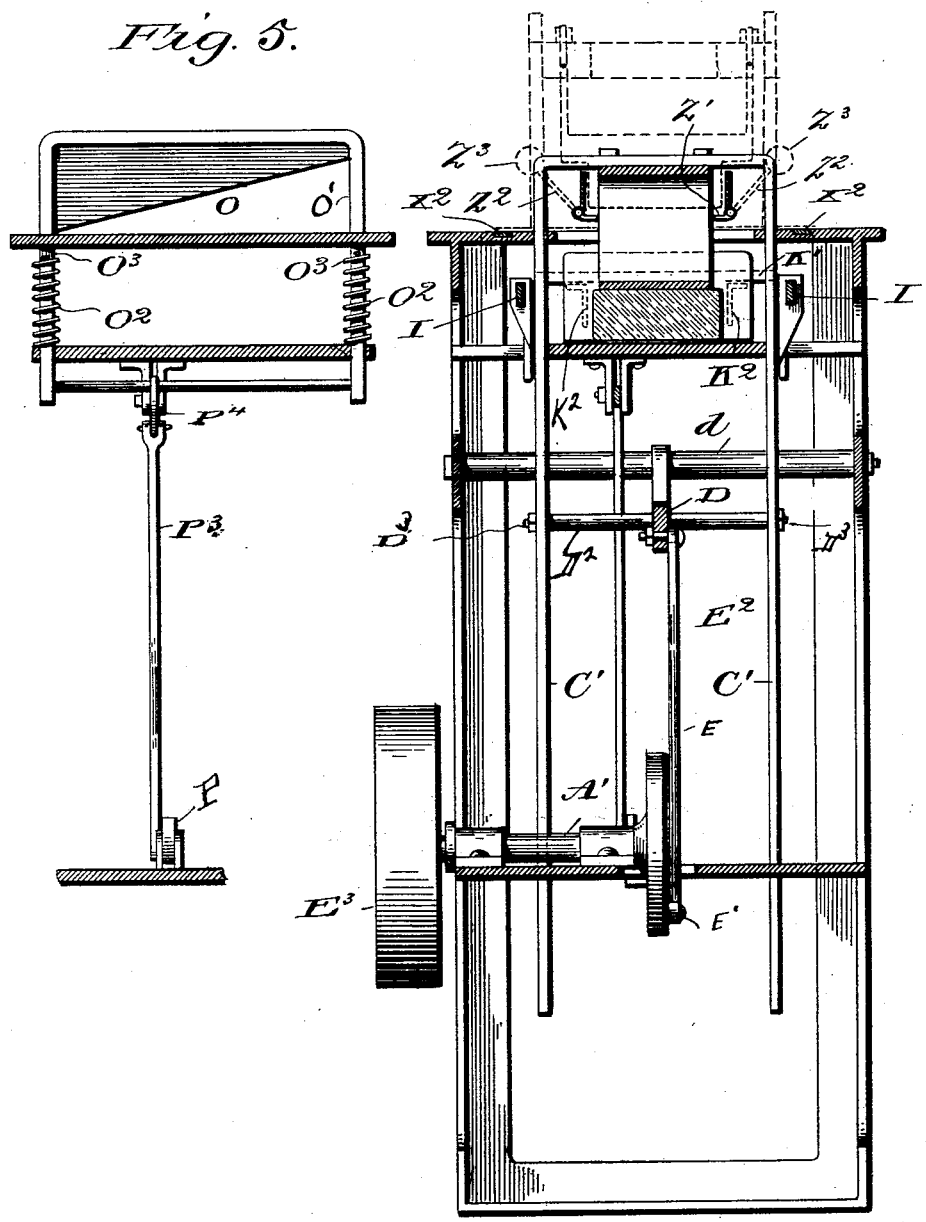

No. 745,810. PATENTED DEC. 1, 1903.
J. H. FELMLEE.
WRAPPING MACHINE.
APPLICATION FILED NOV. 12, 1898.
NO MODEL. 6 SHEETS—SHEET 5.
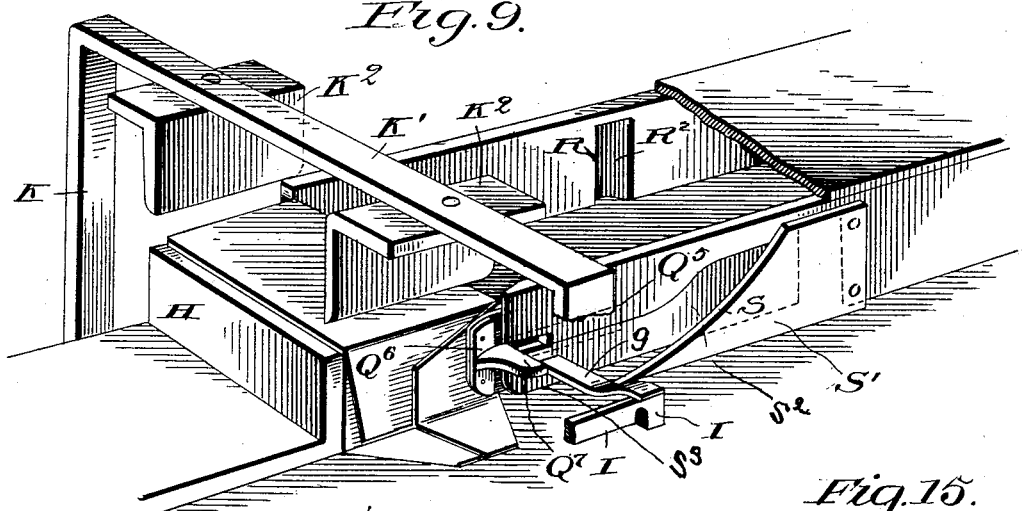
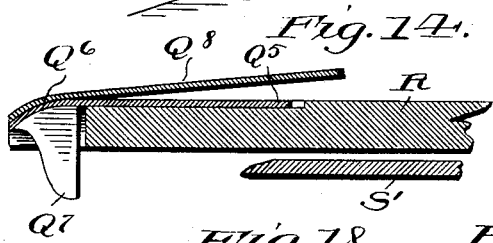
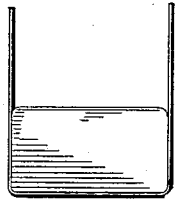
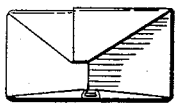
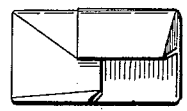
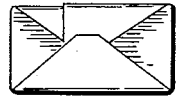

No. 745,810. PATENTED DEC. 1, 1903.
J. H. FELMLEE.
WRAPPING MACHINE.
APPLICATION FILED NOV. 12, 1898.
NO MODEL. 6 SHEETS—SHEET 6.

No. 745,810.

Patented December 1, 1903.

UNITED STATES PATENT OFFICE.

JOHN H. FELMLEE, OF PITTSBURG, PENNSYLVANIA, ASSIGNOR TO THE EAST END MANUFACTURING COMPANY, OF PITTSBURG, PENNSYLVANIA.

WRAPPING-MACHINE.

SPECIFICATION forming part of Letters Patent No. 745,810, dated December 1, 1903.

Application filed November 12, 1898. Serial No. 696,290. (No model.)

*To all whom it may concern:*

Be it known that I, JOHN H. FELMLEE, a citizen of the United States, residing at Pittsburg, in the county of Allegheny and State of Pennsylvania, have invented certain new and useful Improvements in Wrapping-Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in machines for wrapping bars of soap or other articles of a uniform size, and in carrying out the present invention it is my aim to generally improve upon and simplify this class of inventions and to render the same practical.

The invention consists of a machine which will receive the articles to be wrapped singly down an inclined chute and deposit each on a wrapping-paper which has been previously cut a proper size, after which the article is forced down onto the folding-table by means of a plunger, in which location folding-arms are manipulated to fold in the flaps and deliver the folded article to a trough, where the articles, with their wrappers folded, push one another along in the trough to make room for the following packages.

The invention relates, further, to the novel construction, combination, and adaptation of parts, as will be hereinafter more fully described and then specifically defined in the appended claims.

The invention is clearly illustrated in the accompanying drawings, which, with the characters of reference marked thereon, form a part of this application, and in which drawings similar characters of reference indicate like parts throughout the several views, in which—

Figure 6:
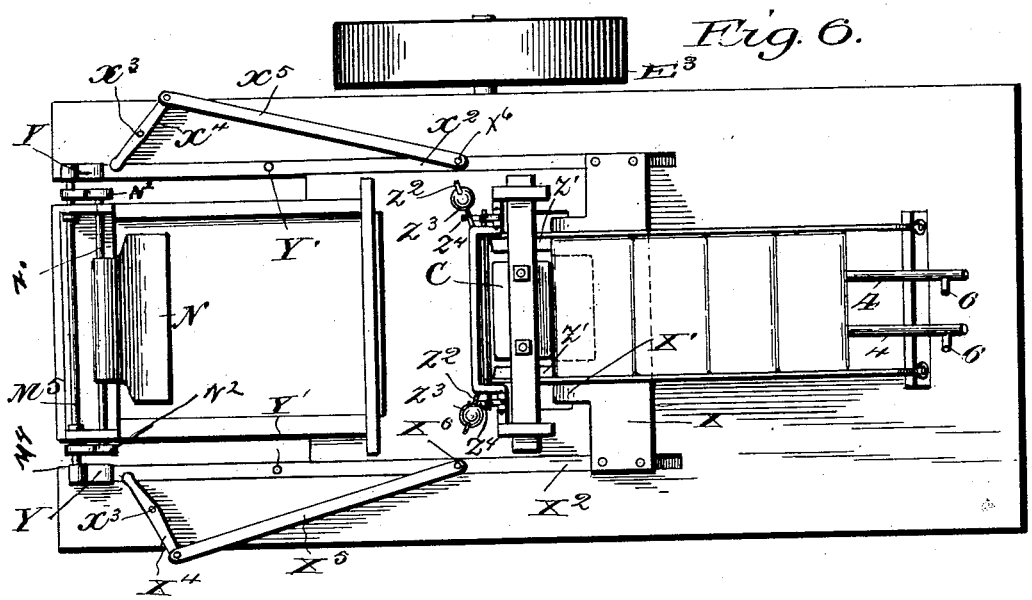
Figure 7:
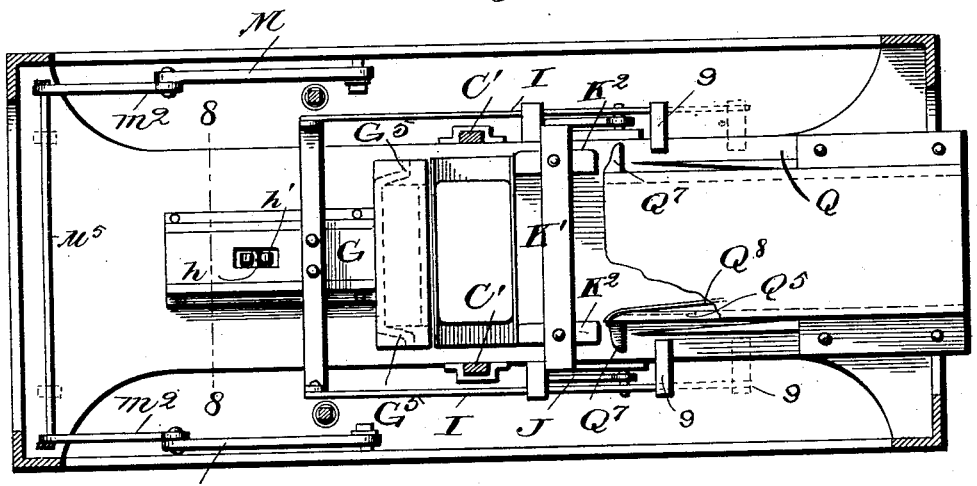
Figure 8:
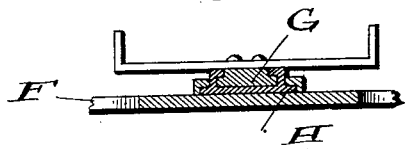
Figure 10:
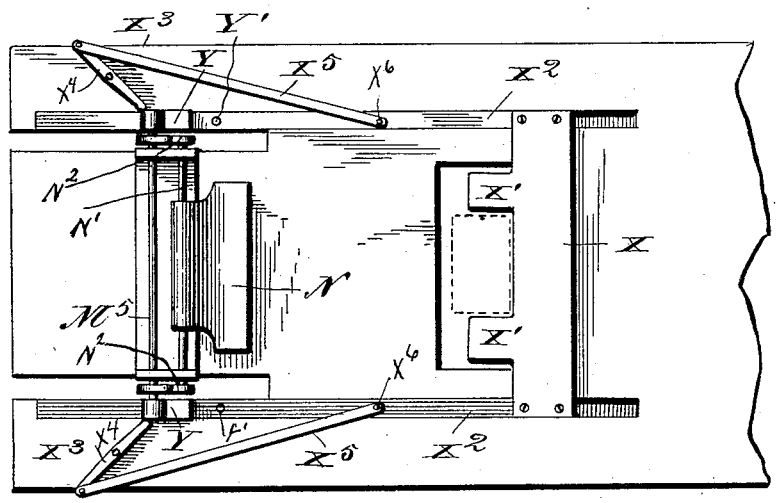
Figure 11:
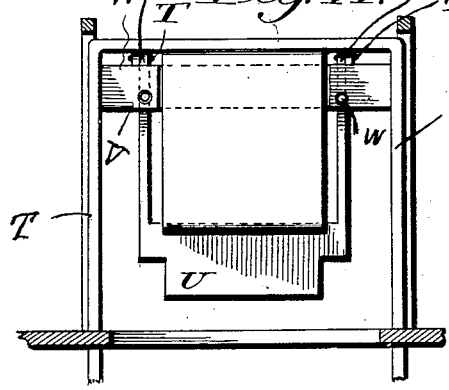
Figure 12:
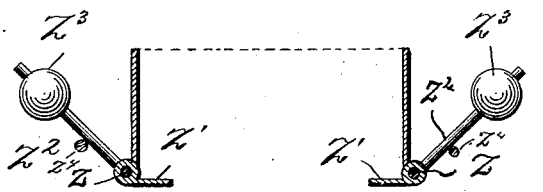
Figure 13:
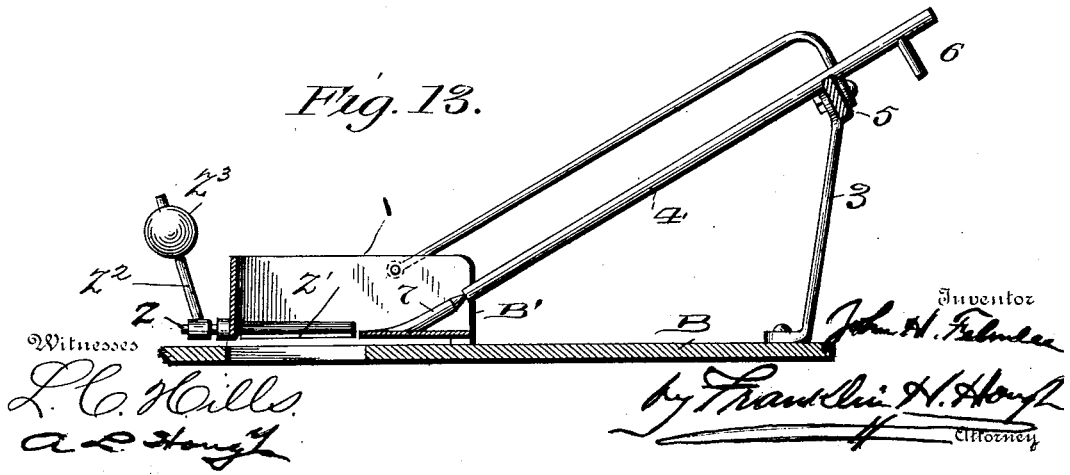

Figure 1 is a central vertical longitudinal section through the machine. Fig. 2 is a side elevation. Fig. 3 is a detail view looking down on the folding-arms. Fig. 4 is a vertical section transversely through the machine at right angles to the section shown in Fig. 1. Fig. 5 is a detail view of the cutting-knife and attachments. Fig. 6 is a top plan view of the machine, showing the top of the plunger-frame, the feeding-trough, and the paper-feeding shoe. Fig. 7 is a horizontal sectional view through the upper portion of the machine, showing the relative arrangement of parts in connection with the folding of the article. Fig. 8 is a sectional view on line 8 8 of Fig. 7. Fig. 9 is a perspective view of a portion of the machine, showing the folding-arms that fold down the upper flaps. Fig. 10 is a top plan view of the table on which paper is fed forth, said view showing the arms for operating slides carrying plates which are designed to support the flaps of the wrapping-paper while in a position to be depressed by the plunger. Fig. 11 is a detail view showing in elevation the means for preventing the plunger from being depressed should a cake of soap fail to slide into position to be depressed by the plunger. Fig. 12 is a detail view in section showing the tilting shelves which receive the cake of soap or other article to be wrapped prior to the latter's being depressed through the aperture and onto the folding-table. Fig. 13 is a detail view showing the feeding-trough. Fig. 14 is a sectional view horizontally through the trough which receives the cake after it has been folded, said view showing the slide adapted to fold the next to the last flap of the parcel. Fig. 15 shows the cake of soap or other article in the position that it assumes when in readiness to be depressed upon its wrapping-paper, which has been positioned to receive the article. Fig. 16 shows the position the cake assumes when it has been depressed, with the wrapping-paper under it, onto the folding-table. Fig. 17 shows the cake with one of its edges and longitudinal flaps folded. Fig. 18 shows the article with the wrapping-flaps folded, with the exception of one edge and the bottom flaps; and Figs. 19, 20, and 21 show successive steps in wrapping the article.

Reference now being had to the details of the drawings by letter, A designates the framework of the machine, which has journaled therein in suitable bearings the driving-shaft A', which may be driven by means of a pulley from any source of supply.

Mounted on the top B of the table and at an angle thereto is the inclined feeding-chute B', down which the articles to be folded are allowed to slide by gravity. At the lower end of the chute is the vertically-movable plunger C, which is made of the general shape illustrated and of rectangular outline with open ends. Secured to the ends of the plunger-head are the plunger-rods C', which work through apertures in the table-top and serve to guide the said rods. The table-top has a rectangular-shaped aperture therein, through which the plunger-head works, and the lower end of the feeding-chute terminates flush with one edge of this aperture. On each longitudinal edge of the said aperture is fastened an angle-plate $C^2$, with its free edges bent down at substantially right angles to the table-top, these plates being provided to hold the article between same as it is forced down by the plunger onto the folding-table proper. The plunger is driven by means of the lever D, which lever is pivoted at one end to the round $d$, which latter is mounted on opposite sides of the frame of the machine. This lever has mounted therein a cross-rod $D^2$, the ends of which rod are connected to the plunger-rod C' at $D^3$. Pivoted to the said rod D is the pitman E, the lower end of which is pivoted at E' to the driving-pulley $E^3$, mounted on the shaft A', whereby as said driving-shaft is rotated the plunger is caused to reciprocate, as will be understood.

Located a suitable distance underneath the top B of the table is the folding-table proper, F, on which the articles are folded. This folding-table is located a suitable distance beneath the top, and working horizontally upon the same are the folding members. These folding members comprise the sliding plate G, which is apertured at G' and rests upon a sliding angular plate H, which latter plate rests on the table F and is provided with an elongated slot H', through which extends the upper end of the cam-operating lever $H^2$, which lever is pivoted at its lower end to a portion of the framework, as shown at $A^2$. The upper end of this lever has a notched portion $h$, in which rests a pin $h'$, mounted in the opposite walls of the recess G' in the plate G, whereby as the said lever is caused to rock the said plate may be fed backward and forward. Mounted on the lugs $G^2$ of the plate G are the arms I, one on either side of the plate, the forward ends of which arms have hooks I', adapted to engage over the pins $I^2$, carried on the angle-levers J, one on each side of the frame, which angle-levers are pivoted, as at J', to stationary portions of the frame of the machine. Mounted on the strips K, which work vertically through apertures in the folding-table top F and secured to the upper ends of these strips, is a cross-piece K', which has secured at suitable locations between its ends the folding-wings or angle-plates $K^2$, which are provided for the purpose of folding down the upper end flaps of the article to be wrapped.

Mounted in the curved elongated slot $H^3$ in the lever $H^2$ is the rod $H^4$, carried by the lever D, which rod, as the lever D works up and down by means of its connection with the said pitman E, will cause the lever $H^2$ to rock backward and forward and in so doing will cause the plates G and H to reciprocate back and forth on the folding-table F for a purpose which will be hereinafter described in detail.

The mechanism for feeding the paper forward on the table to a position underneath the article to be wrapped and the means for cutting off the paper to a right size consists of the following mechanism, viz:

Mounted on the bracket L at one end of the frame is the reel of paper L', and at the upper angled portion of the said bracket is mounted the feed-roll $L^2$ and the printing-roller $L^3$, between which the paper is fed to receive its printing impression on its lower or under surface, and thence leads to and rests upon the surface of the table, as seen at $L^4$. Suitable band connections are made between the printing-roll and the driving-shaft (shown in dotted lines) for operating the same.

$L^5$, $L^6$, and $L^7$ are inking-rollers, and $L^8$ is an ink-trough.

Mounted on the cross-piece $A^3$ of the machine is the angled lever M, pivoted at $m$, the upper end of which lever is pivoted, as at M', to a link $M^2$, which in turn is pivoted to a rod carrying levers $M^\times$, the upper ends of which are provided with notched heads $M^3$, which are pivoted at $M^4$ $M^4$ on a rod $M^5$, mounted in vertical projections $M^6$ on the plate $M^7$ on opposite sides of the frame, as shown clearly in Fig. 6 of the drawings. This slide works horizontally on the table-top B, and in order to engage the wrapping-paper and feed the same forward the shoe N is employed, which is pivoted on a rod N'. Also mounted on the said vertical projections $M^6$ are the arms of said shoe, having teeth $N^2$, which are adapted to engage in notches in the heads $M^3$ of the levers $M^\times$, whereby as the lower ends of the said levers $M^\times$ are tilted forward the shoe N will be forced down on the paper, and a further tilting movement of the lever M in the same direction will cause the shoe to be carried forward and with it the wrapping-paper. The lower end of the angle-lever M has an enlarged slotted portion $M^7$, in which works the rod $M^8$, which rod is carried by the lever D, and as the latter works up and down the said angle-lever is rocked on its pivot and through its connection with the feeding-shoe causes the latter to be reciprocated backward and forward. Owing to the peculiar outline of the aperture in the lower end of the angle-lever M, which peculiar shape is of vital importance in the operation of my machine, it will be noted that in the upward movement of the lever D the angle-lever will be slightly tilted after the round or bar $M^8$ has traveled the length of the aperture in said lever and strikes against the upper end of the apertured portion. By providing the enlarged upper end of the aperture as shown the shoe which is holding the wrapping-paper to the table-top will pause slightly when the shoe is fed forward to its limit, which will cause the paper to be held securely by the shoe while the cutting-knife is depressed to cut off the wrapping-paper the desired length, and in the further revolution of the operating-pulley and connections therewith the rod $M^8$, carried by lever D, engaging against the lower margin in the aperture $M^7$, will cause said lever M to tilt back to its starting position as the lug strikes against the lower end of the aperture. As the lever M begins to tilt back, the shoe will be released from the paper and will slide back in readiness to engage with and advance the paper for the next wrapper.

In cutting the strips of paper the required size a knife O is provided, which is mounted on the yoke O', which works vertically through apertures in the table-top and has mounted on its arms the springs $O^2$, which bear between the folding-table F and lugs $O^3$ on the yoke carrying the knife and serve to return the knife to its starting position after it has been depressed and the paper cut. The yoke is depressed onto the paper by means of the trip-lever P, which is mounted on a lug P' on the framework of the machine and has its free end extending in the path of the lug $P^2$, mounted on the driving-wheel, so that at each revolution of the driving-wheel, when the said lug $P^2$ comes in contact with the free end of the trip-lever, the latter will be tilted on its pivot, and through its connection by means of the levers $P^3$ and $P^4$ with the lower end of the yoke the latter will be operated, as will be clearly understood.

The said sliding plate G has its forward end upwardly turned at right angles, as shown clearly at $G^3$ in Fig. 1 of the drawings, and has secured to its upper edge a horizontally-disposed folding-blade $G^4$ and at its ends has the outwardly-flaring folding-blades $G^5$. The said folding-blade $G^4$ extends slightly farther forward than the edge of the folding-blades $G^5$, and the ends of the blade $G^4$ extend laterally a slight distance beyond the outer ends of the blades $G^5$. The outer end of the plate H is upwardly bent, as at $h^2$, and forms a stop against which the plate G is adapted to strike to return the said plate H to its starting position after the plates have been drawn forward in their folding operation, and secured to the folding-table F is a stop $F^2$, which limits the outward movement of plate H. To the forward angled end of the plate H is secured a spring-flap $H^6$, which is adapted to have its lower free end bent downward and bears yieldingly against the article being wrapped, thus forming a wall against which the article receiving its wrapper may be held while the end flaps are being folded by the folding-wings carried by the sliding plate G. It will be noted from the foregoing when taken in connection with the drawings, as clearly shown in Fig. 1, that when the article has been depressed by the plunger onto the folding-table and the plate G advances slightly the end and top flaps on one side will be folded over the article, and when the angled portion $G^3$ of the slide G strikes the angled portion of the sliding plate H the latter will be fed forward and with it the article being wrapped will be advanced to a position underneath the cross-piece K', which has secured between its ends the end folding-wings or angle-plates $K^2$. After the article being folded has reached this latter position it will be noted that the hooked ends of the arms I will have been pushed forward beyond the lugs, which are adapted to be engaged by said hooked ends; but on the return movement of the plate carrying the arms I the hooked ends of said arms will engage over the lugs and will cause the folding-wings $K^2$ to be depressed against the upper flaps and fold the same against the article.

Mounted in the walls of the sides of the trough Q in their inner faces are the slides $Q^5$, which work in dovetailed slots therein. Each outer end of the slides has a folding-wing $Q^6$ disposed at an angle, preferably as shown in Fig. 14 of the drawings, and to the outer face of said angled portion of each wing is a lug $Q^7$, which extends laterally from said folding-wings and in the path of the bars 9, which bars are secured to the outer ends of the hooked portion of the levers I, one on each side of the trough. These bars 9 are provided to strike against the rear edge of said lugs $Q^7$ and throw the folding-wings forward against the edge flap of the wrapper when the hooked arms are drawn back to their starting position, which operation, as will be clearly seen, will fold the next to the last flaps of the wrapper. Each side of the trough is provided with a similar folding-slide $Q^5$, the outside faces of which slides are flush with the inside faces of the sides of the trough. These folding-wings $Q^6$ are returned to their starting positions when the succeeding article being wrapped forces the article at the entrance to the trough between its side walls. To the outside face of each of the folding-wings $Q^6$ is attached a spring-flap $Q^8$, the free end of which extends back into the trough and is provided to hold the flaps of the wrapper against the article while the latter is being advanced to have its last flap folded by mechanism which will now be described. The free end of the trough, which is provided to receive the articles after being wrapped, has its sides beveled away, as shown clearly in Fig. 9, and each side wall to said trough at its entrance is slotted up from the bottom to nearly the upper edges of said side walls, each slot in the side walls extending lengthwise of the trough and diagonally through the side walls. The wall $S^2$ on each side of the trough is cut away to form a compound curve, the lower forward end of said curved wall terminating in a ridge S³ at the lower end of the side, while the rear end of the curved wall in the slot terminates in a vertical ridge at the point indicated in the drawings in Fig. 9 as letter R. The last flaps of the article being wrapped as the article is forced by a succeeding article into the end of the trough enter the open slots at their lower ends, and the outer faces of the flaps engaging against the curved margins S of the plates S', which form the outer walls to the slots in the sides of the trough, will be folded up into the slots, will pass through the openings R², and as the article being folded passes the openings R² the end flaps will bear against the inside faces of the trough and be held against the article.

In order to prevent the plunger being depressed should it happen for any reason that an article to be wrapped did not slide down the feeding-chute into a position underneath the plunger, I have provided the following means to automatically hold the plunger suspended, thus allowing the belts to slip on the pulleys and the machine to stop: Mounted on the upright posts T on the frame of the table is a rod T', on which is journaled a swinging rack or plate U, the lower end of which normally rests in advance of an article being fed underneath the plunger and in the path of the vertical operating-plunger. This plate has arms, which are curved at their upper pivotal portion, as at U', and each arm is provided with a pin or lug W, which extends through apertures in the cross-piece V, secured to the uprights T. When the said plate U is hanging normally, the end of the lugs W extend out and into the path of the plunger and are adapted to hold the same from being depressed should it happen for any reason that the article to be wrapped did not feed forward against the free swinging end of said plate, which would cause the plate to be swung back out of the path of the plunger and cause the lugs or pins W to be withdrawn and allow the plunger to operate. This plate U is made of light material, and the momentum of an article coming down the incline feeding-chute is sufficient to swing it back out of the path of the plunger. After the plunger has returned to its starting position said plate will resume its normal position, being always in readiness to check the plunger in case the article is not in readiness to be fed forward.

Mounted in the side walls of the frame adjacent to the plunger are the rods Z, one mounted on either side of the aperture through which the plunger works and at the outlet end of the feeding-chute. These rods have shelves Z', which are adapted to be normally held in a horizontal position and to extend out into the aperture through which the article to be wrapped is designed to pass, and are provided to receive and support the article before the plunger depresses the latter through onto the folding-table. Secured to the ends of the rod Z are the extensions Z², which carry weights Z³ thereon, which may be provided with thumb-screws in order to adjust the weights at different locations on said extensions Z². These weights are provided to normally hold the shelves in a horizontal position and adapted to tilt up as the shelves turn down to allow the article to be forced through onto the folding-table, and after the plunger has returned to its starting position said weights will resume their normal position, as shown clearly in Fig. 12 of the drawings. The shelves are held normally in a horizontal position by means of the outward throw of each extension Z² being limited by the lug Z⁴. (Shown in Fig. 6 of the drawings.)

In order to support the ends of the wrapper over the aperture in the table-top before the plunger depresses the article and the wrapper underneath the same onto the folding-table, I provide the plate X, which plate has notched extensions X' extending forward at each end of the plunger and over the aperture through which the plunger works. This plate X is secured at its ends to the sliding strips X² on either side of the table and running longitudinally, said strips being set in grooves in the table-top with their upper faces flush. Pivoted to the table-top at X³ are the levers X⁴, to the outer ends of which levers are pivoted the links X⁵, which links are in turn pivoted to the slides X² at X⁶. Pivoted loosely on the outwardly-extending ends of the rod M⁵ are the dogs Y, the free ends of which are adapted to rest normally on the upper faces of the strips X². The free ends of the levers X⁴ are disposed in the paths of the said dogs, as will be clearly seen in Fig. 6 of the drawings. As the said dogs are advanced as a sheet of wrapping-paper is fed forward underneath the plunger they will strike the free ends of said levers X⁴, will draw forward the plate X, so that its extensions X' will be positioned over the opening into the table-top and at each end of the plunger. After the dogs Y have passed by the free ends of the levers X⁴ and come in contact with the lugs Y' on the slides X² the slides X² will be forced back to their starting position, and on the return movement of the dogs Y to their starting position the latter will ride over the ends of the levers X⁴, as will be clearly understood.

The feeding-chute to my machine, which is disposed preferably at the angle shown in the drawings, is made up of the box 1, with apertures therein at one end to allow the article to pass through the same, and to the side walls of the said box are secured the side rods 2, the upper ends of which are mounted on the supports 3, fastened at their lower ends to the table-top. The bottom of the chute is made up preferably of rods 4, which are journaled at their upper ends to the cross-piece 5, mounted on the braces 3. Each of said rods 4 has a handle 6 at its upper end, and the lower end of each rod is recessed out conically and adapted to fit over the conical pointed end of a rod 7, thus allowing each of the rods 4 to be rotated, which provision is made for allowing the rods to be readily cleaned while the machine is in operation.

In operation the wrapping-paper having been fed forward to a position over the aperture in the table-top and the article having slid down the feeding-chute by gravity on the said paper the machine as the operating-shaft begins rotation will cause the plunger to be depressed onto the upper face of the article, forcing the latter down onto the folding-table top F. The plunger is operated by means of its connections with the pitman E and lever D, which is pivoted by a rod $D^2$ to said plunger-rod C'. The article having been depressed onto the folding-table and in the downward movement of the lever D, which draw down the plunger, it will be noted that the lug $M^8$ will strike against the lower margin of the aperture $M^7$ in the angle-lever M and cause the shoe N to be returned to its starting position, while the plunger is down. When the plunger is at its highest limit and the pulley on the shaft A' begins to rotate, at which moment the shoe N is driven forward to its innermost limit, still holding the wrapping-paper on the table-top B, the lug $P^2$ on the driving-wheel will have tripped the lever P, which through its connections by levers $P^3$ and $P^4$ to the vertical spring-actuated knife-rods will cause the knife to be depressed and the wrapping-paper cut off the desired length, the shoe being designed to hold the paper adjacent to the knife for a moment while the knife is operated, which pausing of the shoe in that position being caused by the peculiar shape of the aperture $M^7$, as when the lever M is tilted up to its farthest limit the angle-lever will be held in its upwardly-tilted position until the lug $M^8$, carried by the lever D, travels the entire length of the slot $M^7$ and strikes against its under margin, after which the lever will be tilted down to its starting position, as will be readily understood. The article to be wrapped being depressed on the folding-table top F the next step in the wrapping of the article is to fold in one of the longitudinal top flaps slightly in advance of the folding in of the edge flaps on one side of the article. The folding of these flaps is accomplished by means of the sliding plates G and H, one sliding on top of the other, which plates are mounted horizontally on the folding-table top F. The slide H in its starting position is shown clearly in Fig. 1 of the drawings, and this plate H has its forward end bent at an angle and has provided on its inner face a spring-flap $H^6$, which presents a wall against which one edge of the wrapping-paper is held securely against the article to be wrapped. The plate G, provided with its vertical and horizontal folding-wings, is fed forward on the plate H a short distance before movement is imparted to the plate H, this being provided to allow the said top and end flaps on the side adjacent to the sliding plates to be folded before the article is advanced forward on the folding-table to have its last flaps folded. The plate G is advanced by means of the lever $H^2$, which is tilted toward the plunger as the lever D is raised in the act of causing the plunger to be lifted to its starting position, this advancing movement which is imparted to the slide G being effected by the lug $H^4$ traveling on the curved outline in said lever $H^2$. As the plate G advances the folding-blade $G^4$ forces in the vertical flap adjacent thereto over the top of the article being folded, and when the side-folding-wings $G^5$ reach the end flaps will fold the latter against the end of the article, and when the angled end $G^3$ of the sliding plate G strikes against the angled end of the sliding plate H the latter will be fed forward and force the article underneath the cross-piece K', which carries between its ends the folding-wings or angle-plates $K^2$, also underneath the downward and outwardly bent spring member $K^3$, which will fold the second longitudinal flap, excepting its ends. It will be noted that as the plate G begins to travel forward the arms I, with their hooked ends, will also advance and the hooks at the ends of said arms, engaging with the lugs on the angle-levers J, will cause the latter to tilt up, which in turn will cause the wings or plates $K^2$ to be raised to allow the article to pass under the same. After the wings or plates $K^2$ are at their highest limit the hooked ends of the arms I will continue on beyond the lugs on the angle-levers, as shown in dotted lines in Fig. 1. The next step in the operation of the wrapping is to cause the folding-wings or angle-plates $K^2$ to be depressed against the top flaps at the ends of the article. This is done on the return movement of the plates G and H to their starting position, and as the plate G returns to its starting position the arms I being drawn back therewith will engage over the lugs on the angle-levers J and cause the folding-wings or angle-plates $K^2$ to be depressed against the top flaps. After the said folding-wings begin to be depressed, caused by the tilting of the angle-levers J, the bars 9, as is clearly shown in Fig. 9 of the drawings, (which bars are connected to the arms I near their hooked ends,) will strike against the lugs $Q^7$, connected to the folding-wings $Q^6$, mounted on the ends of the slides $Q^5$, and will cause said wings $Q^6$ to be advanced against the next to the last flaps of the wrapper, thus folding said flaps in at each end. The article now has all of its flaps folded with the exception of the last or bottom ones, and these flaps are folded against the end of the article as the said article is forced into the end of the trough by a succeeding article, which is forced against the edge of the article nearly folded. As the said article is forced into the end of the trough the folding-blades $Q^6$, connected to the slides $Q^5$, are forced back to their starting position, and the last flaps entering the longitudinally and diagonally disposed slots in the side walls of the trough will be folded up against the article and held against the ends thereof as the articles are advanced through the trough, as will be readily understood. It will be noted that as the article is forced into the end of the trough the spring-flaps $Q^8$, which are mounted on the sliding plates $Q^5$ to hold the folded flaps tightly against the article, while the last flaps are being folded by their passing through the peculiarly-shaped slots in the side walls of the trough. As the plate G returns to its starting position it strikes against the lug or an upturned end of the plate H, thus carrying the plate H back with said plate G to its starting position, and a lug $F^2$, secured to the folding-table top, serves as a limit to the outward throw of said plate H.

The wrapping-paper is mounted on a reel L' and is fed between the printing-rollers $L^3$ and friction-roller $L^2$ and leads to and rests upon the top B of the machine, and interposed between the ink-font $L^8$ are the rollers which distribute ink to the printing-roller, said printing-roller being operated by means of the belt connected with the main operating-shaft. By the peculiar shape of the head of the lever $M^\times$, which has a notch adapted to be engaged by a tooth $N^2$ on the arm of the shoe, said shoe, it will be noted, will be tilted downward as the lower end of the lever $M^\times$ is tilted forward, which forces the shoe securely down on the paper, and as the shoe advances on the table-top will cause the paper to be fed forward toward the plunger. In order to support the ends of the wrapping-paper after it is fed forward to a position underneath the plunger and over the aperture through which the plunger works, the plate X is brought into play. This plate being connected to the sliding strips $X^2$ is fed forward, so that its projecting portions extend over the aperture at the ends of the plunger to receive the wrapping-paper. This plate is fed forward by means of the dogs Y striking against the free ends of the levers $X^4$, which causes the plate to be drawn forward, and after the dogs have passed by said levers $X^4$ and come in contact with the lugs Y' on said strips it will be observed that the said plate will be drawn back to its starting position and the levers $X^4$ will be also returned to their starting positions, and as the shoe returns the dogs Y will ride loosely over the ends of the levers $X^4$ and be in readiness for operating the same at the next forward movement to feed the wrapper underneath the plunger.

At the exit of the feeding-chute and over the aperture through which the plunger works the shelves Z are disposed. These shelves extend out a slight distance over the aperture in a horizontal position and are adapted to receive the ends of the article before being depressed through to the folding-table. As the plunger descends on an article when in position on said shelves the latter will tilt down as pressure is applied to the article and the weights at the ends of the arms connected to said shelves will tilt up, allowing the article to pass through the aperture, and after the article has reached its folding-table said shelves will return to their normal positions by reason of the weights falling by gravity to their starting positions.

The means which I have provided for automatically preventing the plunger from being depresssed should it happen from any cause that the article was not fed forward to a position directly underneath the plunger consists of the swinging plate U, which normally rests in the path of the plunger and against which the article as it slides down the feeding-chute by gravity strikes and swings the plate back out of the path of the plunger and in so doing withdraws the lug W, carried by said swinging plate, and allows the plunger to operate freely. In case an article was not fed forward in the position to be depressed by the plunger the lugs carried by the plate, which extends out a slight distance in the path of the plunger, will engage the latter and stop the machine, thus causing the belt to slide on the operating-shaft and be held from operation until the folding-blade is swung back, so that the lugs carried thereby will be out of the path of the plunger.

In order to allow the rods 4, forming the bottom of the feeding-chute, to be cleaned, they are made as shown and described, so that by taking hold of the handle 6 said rods may be partially rotated, so as to present a clean portion of the rods to the articles which slide down the trough and the surfaces which are exposed on their under sides may be wiped off.

Having thus described my invention, what I claim to be new, and desire to secure by Letters Patent, is—

1. A machine for wrapping articles, comprising in combination with the frame, the chute plunger, and table on which the articles are wrapped, the horizontally-disposed and longitudinally-movable plates on said table-top, one of said plates provided with side and end folding blades, and the second one designed to assist in holding the article while being partially wrapped, and to advance the article, vertically-operating end-folding blades, and connection between the latter and one of said longitudinally-movable plates, and means for operating said plates and plunger, as set forth.

2. In a wrapping-machine, the table, the feeding-chute, the plunger, the horizontally-sliding angled plates mounted on the folding-table, the upper one of said sliding plates carrying vertically and horizontally disposed folding-blades, the pivoted operating-lever for reciprocating said plate carrying the folding-blades, pivoted hooked levers carried by said upper sliding plate, the vertically-movable bars and folding-blades carried thereby, the angled levers pivoted to the framework, and having pivotal connection with said bars and lugs carried at the other ends of said angle-levers, adapted to be engaged by the hooked ends of said levers, whereby as the sliding folding-blade-carrying plate is reciprocated, said vertically-operating blades will be raised and lowered, as set forth.

3. In a wrapping-machine, the table, the feeding-chute, the plunger, the sliding angled plates, one of which is provided with folding-blades as described, the lever having pivotal connection at its lower end with the frame, its upper end pivoted to the upper one of the two sliding plates, the hooked levers pivoted to the latter, the vertically-movable bars and folding-blades carried thereby, the angle-levers pivoted at their angles to the frame, their lower ends having a loose pivotal connection with said bars, and lugs at their opposite ends, said lugs being adapted to be engaged by the hooked levers, to raise said vertically-operating folding-blades as the plates start forward, and when said blades reach their highest limit, the hooks in said levers being designed to disengage with the lugs on the angle-levers and slide forward on said lugs, and in the return movement of the sliding plates to their starting position, said hooks being designed to engage with the lugs and draw the vertically-operating folding-blades down to their starting position, combined as set forth.

4. In a wrapping-machine, the combination with the table, the plunger, feeding-chute and horizontally-sliding plates, one on top of the other, the upper of which carries folding-blades, of the lever pivoted at its lower end to the frame of the machine, its upper end curved and having an elongated slot conforming to the upper curved end, a projecting portion at the upper end of said lever having pivotal connections with the plate carrying the folding-blades, the operating-lever and pitman connection with the driving-pulley, and a rod carried by said lever to which the pitman is connected, said rod adapted to travel in the curved slot in the lever having pivotal connection with the sliding plate, as shown and described.

5. In a wrapping-machine, the combination with the frame, the plunger and means for operating the same, the horizontally-sliding angled plates one superimposed on the other, a lever for actuating the upper of said plates, the lower plate having a stop at its rear end against which the upper plate is adapted to strike to return the lower plate to its starting position, and a stop to limit the outward throw of said under plate, and means for operating the plates, as shown and described.

6. In a wrapping-machine, the combination with the frame and top thereof, the plate working thereon, a rod N' mounted in lugs on said plate, a shoe carried by said rod, a second rod M⁵, notched levers M³ carried on the latter, and means for operating said levers, and members mounted at the ends of said rod N' and having each a tooth designed to engage in said notches, whereby the shoe may be held under pressure against wrapping-paper on the table-top and fed forward, as shown and described.

7. In a wrapping-machine, the combination with the frame and top thereof, of a sliding plate on said top, a shoe carried by the plate, said shoe being designed to be depressed against the table-top to advance a wrapping-paper carried thereon, and mechanism for operating the shoe and feeding the plate carrying the shoe forward, a cutting-knife, and means for operating the same, and mechanism for causing the shoe to tarry at the limit of its inward throw while the knife severs the wrapping-paper, as shown and described.

8. In a wrapping-machine, the combination with the table-top, the sliding plate thereon, the angle-lever pivoted to the side of the frame, the shoe and notched lever pivoted on said plate, said notch being engaged by a tooth on the arm of the shoe, to depress the shoe, the link connection between said notched and angled lever, and means for tilting the angle-lever, whereby the shoe is depressed and fed forward, as shown and described.

9. In combination with the frame of a folding-machine, the angled lever pivoted to the frame, the shoe and connection between the same and said angled lever as shown, the lower end of said angled lever having an elongated slot as shown and described, and the pivoted lever carrying a rod adapted to engage in said elongated slot, whereby as the said lever carrying the rod engaging in said slot is raised or lowered, the shoe will be depressed onto the wrapping-paper, and fed forward, and allow the shoe to pause a moment while the wrapper is being cut, and then be returned to its starting position as the angle-lever is tilted back, as shown and described.

10. In combination with the frame of a folding-machine and top therefor, the angle-lever pivoted to the side of the frame and provided with an elongated aperture at its lower end, the pivoted lever D, a rod carried thereby and engaging in said aperture, a sliding plate on the top of the frame, a feeding-shoe and notched lever pivoted to said plate, said notched lever having a connection with the angle-lever, a tooth on the arm of said shoe, which tooth engages in a notch in the lever carried by said plate, whereby as the apertured angle-lever is tilted up said shoe will be depressed against the top and in the tilting down of said lever the shoe will be raised from contact with the top and returned to its starting position, and means for operating the mechanism.

11. In a wrapping-machine, the combination with the folding-table and means for folding the flaps as described, of the receiving-trough having vertical slots in each side wall, the inner wall of each slot being curved as described and disposed diagonally through said wall in which slot the end flap is designed to engage and be folded against the end of the article, as shown and described.

12. In a wrapping-machine, the combination with the table-top, the feeding-plate sliding in guideways in said top, a rod carried by said plate, a paper-holding shoe mounted thereon, the arms of said shoe having lugs, the angle-levers pivoted to said plate and engaging with said lugs and connections whereby said shoe may be tilted down and the plate carrying the same advanced, as shown and described.

13. In a wrapping-machine the combination with the frame, the table-top therefor, the angle-plate secured to the under side thereof adjacent to the article-feeding aperture therein, the spring-flap $K^3$ secured to the lower free edge of said angle-plate designed to hold the flaps of the wrapper, while the article being wrapped is fed forward to an exit-trough, as shown and described.

14. In a wrapping-machine, the combination with the frame the folding-blades and means as described for operating same, of the trough for receiving the wrapped articles, said trough being inclosed on its four sides, with open end to receive the partially-wrapped article, each side wall adjacent to its open end being slotted up from its lower edge longitudinally and diagonally through the wall, and opening into the interior of the trough the lower edge of the portion of the side between the slot and the interior of the trough, being cut away to allow the last flap of the wrapper to pass thereunder, and said portion tapering on its outer face from the upper margin of its slot to a sharp edge at its lower end, as set forth.

15. In combination with the feeding-chute, plunger and means for operating the same, tilting shelves mounted in the apertures at the end of said trough, and designed to receive the articles and hold the same suspended until depressed by the plunger, and the outwardly-extended arms with weighted ends connected to said shelves, which arms are designed to be thrown to their highest limit under the impact of the plunger striking the article against said shelves thus allowing the latter to tilt down without their edges cutting into the sides of the article, said shelves adapted to return to their normal positions after the article has passed below the same, as set forth.

16. A feeding-trough for wrapping-machines, comprising in combination with the walls of the trough, the inclined rotatable bars disposed lengthwise in the trough, and forming a bottom therefor, as set forth.

17. In combination with the feeding-chute of a wrapping-machine, the bars 7 having conically-pointed ends, the rotatable rods 4 having conical-shaped depressions in their lower ends adapted to have bearings on said conical points 7, and handles on said bars for rotating the same, as set forth.

18. In combination with the vertically-movable plunger and the feeding-chute of a wrapping-machine, a plate and lugs carried thereby, which latter are normally held in the path of the plunger and thrown out of said path as the article to be wrapped slides down the chute and against said plate, and means for operating the plunger, as set forth.

19. In combination with the frame of a wrapping-machine, the plunger working thereon and the feeding-chute as described, a swinging plate mounted in the path of the articles as they slide down by gravity to a position to be depressed by the plunger said plate normally presenting a stop to prevent the plunger being depressed until the plate is swung back out of the path of said plunger, as shown and described.

20. The combination with the frame of a wrapping-machine, the feeding-chute, the plunger and means for operating the same, of an automatically-operated swinging stop-plate having lugs thereon which are normally disposed in the path of the plunger, and adapted to hold the same from being depressed and designed to be swung out of engagement with said plunger, as an article to be wrapped slides down into a position to be depressed by the plunger to receive its wrapper, as shown and described.

21. The combination with a wrapping-machine, the feeding-chute, the plunger and means for operating the same, a frame provided with apertures and swinging plate supported thereon, lugs carried by the arms of said plate, said lugs extending through apertures with their free ends in the path of the plunger, and adapted to be thrown out of the path of the plunger, as the plate is swung laterally as shown and described.

22. In combination with the table of a wrapping-machine, the plunger, the feeding-chute, the wrapper-feeding shoe and plate carrying same, the wrapper-supporting plate, the sliding strips carrying the latter, the upper faces of said strips being flush with the table-top and means for reciprocating said strips and supporting the plate as the paper-feeding apparatus advances toward the plunger, and for subsequently retracting said paper-supporting plate, as set forth.

23. In combination with a wrapping-machine, the table-top, the shoe-carrying plate mounted thereon, the rod carried by said plate, the dogs pivoted on said rod, the sliding strips mounted in the table-top, the wrapper-supporting plate carried thereby, and levers pivoted to said sliding strips and to the table-top which levers are adapted to be tripped by said dogs to advance the wrapper-supporting plate, and means for returning said plate as set forth.

24. In combination with the top of a wrapping-machine, the horizontally-movable shoe-carrying plate, the rod carried by upright projections on said plate, the dogs pivoted on the ends of said rod, the wrapper-supporting plate, the sliding strips supporting the latter, the trip-levers pivoted to the table-top, with their inner ends in the path of said dogs, the links pivoted to said sliding strips, and to the outer ends of said trip-levers, and the lug on the sliding strips against which the free ends of the dogs engage to return the wrapper-supporting plate to its starting position, as set forth.

25. In combination with the sides of the trough designed to receive the partially-wrapped articles, in a machine of the character described, sliding plates mounted in said sides, folding-blades secured to said plates and means for throwing the latter forward to fold the end flaps, as set forth.

26. In combination with the sides of the trough designed to receive the partially-wrapped article in a wrapping-machine of the character described, slides mounted in recesses in said side walls, laterally-flaring folding-blades mounted at the ends of said slides, reciprocating arm and lugs on said blades disposed in the path of said arm, whereby as the latter is actuated, the blades are driven forward, as shown and described.

27. In combination with the trough designed to receive partially-wrapped articles in a machine of the character described, the slides working in dovetailed recesses in the walls of said trough, the folding-blades secured to the ends of said slides, the spring-flaps fastened to the inner faces of said blades and extending back into the trough, the lugs on the outer faces of said blades, the hooked arms I and means for operating same, and the bars 9 secured to the hooked ends of said arms, and designed to strike against the lugs on the folding-blades, as set forth.

In testimony whereof I affix my signature in presence of two witnesses.

JOHN H. FELMLEE.

Witnesses:
 A. L. HOUGH,
 J. M. PFEIFFER.